United States Patent [19]

Ames et al.

[11] Patent Number: 4,712,920
[45] Date of Patent: Dec. 15, 1987

[54] APPARATUS FOR MANUFACTURING SOFT ICE CREAM AND THE LIKE

[75] Inventors: Theodore Ames, Portland; Vernon E. Brown, Jr., Yamhill, both of Oreg.

[73] Assignee: Glacier Products, Inc., Portland, Oreg.

[21] Appl. No.: 769,664

[22] Filed: Aug. 26, 1985

Related U.S. Application Data

[63] Continuation-in-part of Ser. No. 637,382, Aug. 2, 1984, Pat. No. 4,551,025.

[51] Int. Cl.[4] .............................................. A23G 9/00
[52] U.S. Cl. ...................................... 366/144; 62/135; 62/342; 366/145; 366/601
[58] Field of Search .............. 366/142, 144, 145, 149, 366/601; 62/342, 343, 132, 135, 137; 374/170; 99/452, 453, 455

[56] References Cited

U.S. PATENT DOCUMENTS 4,241,590 12/1980 Martineau ..................... 366/320 X
4,463,572 8/1984 Brown, Jr. ..................... 366/144 X
4,551,025 11/1985 Ames et al. ..................... 366/145 X

*Primary Examiner*—Timothy F. Simone
*Attorney, Agent, or Firm*—Jack E. Day

[57] ABSTRACT

An improved microprocessor controller program, for soft ice cream manufacturing machines and the like, for maintaining the quality of the frozen product during times of low usage, when such products have a tendency to "age" in both consistency and flavor. The controller keeps track of the quantity of product served during a given base period, and reduces the serving temperature of the product a preselected amount each time a given quantity has not been served therein. The serving temperature is reset to the desired serving temperature whenever said given quantity has been served, thereby avoiding the quality problem which could arise if said given quantity were served at the beginning of one base period but not until the very end of the following base period, thus allowing nearly two base period to elapse without a desired reduction in temperature.

21 Claims, 10 Drawing Figures

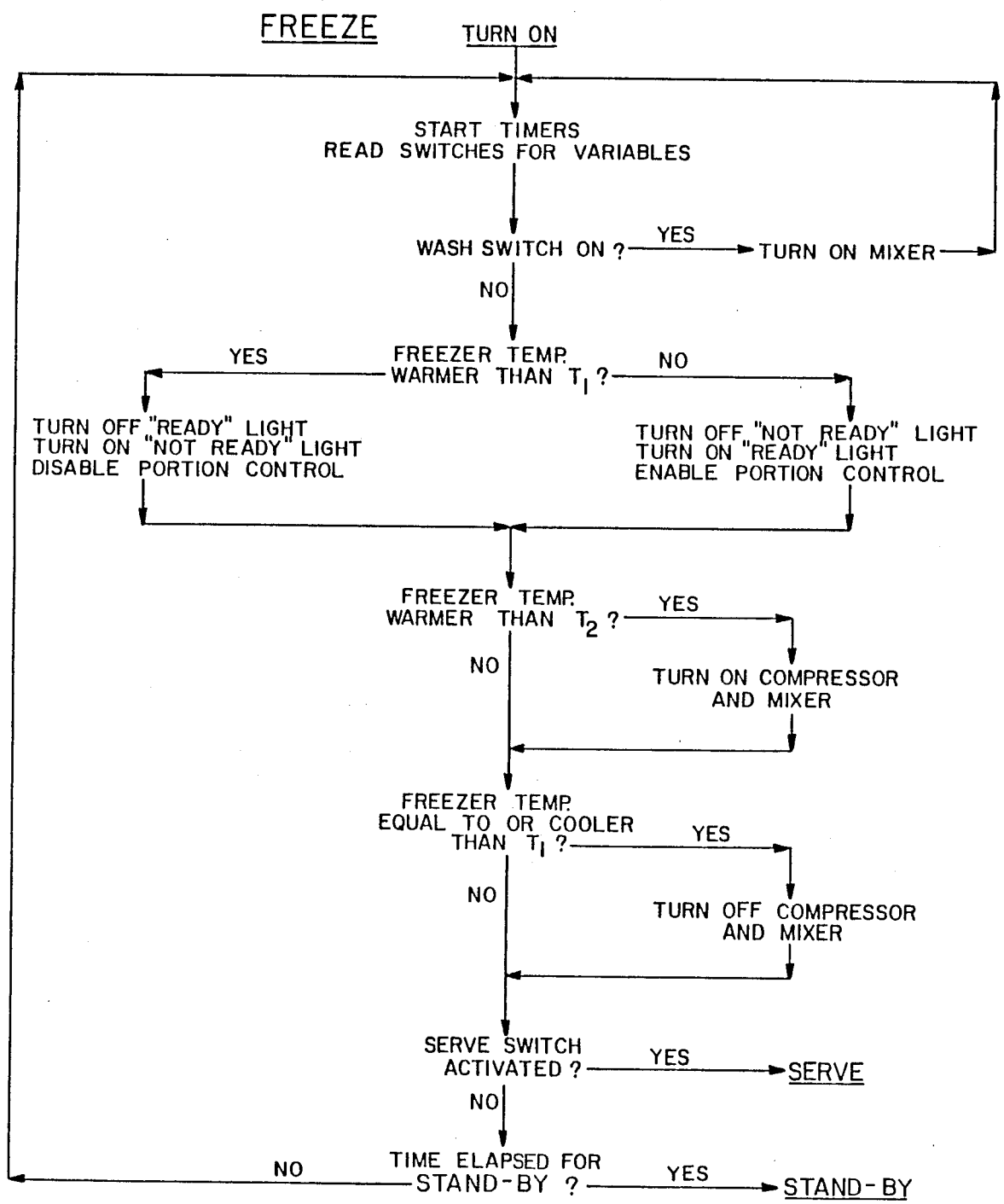

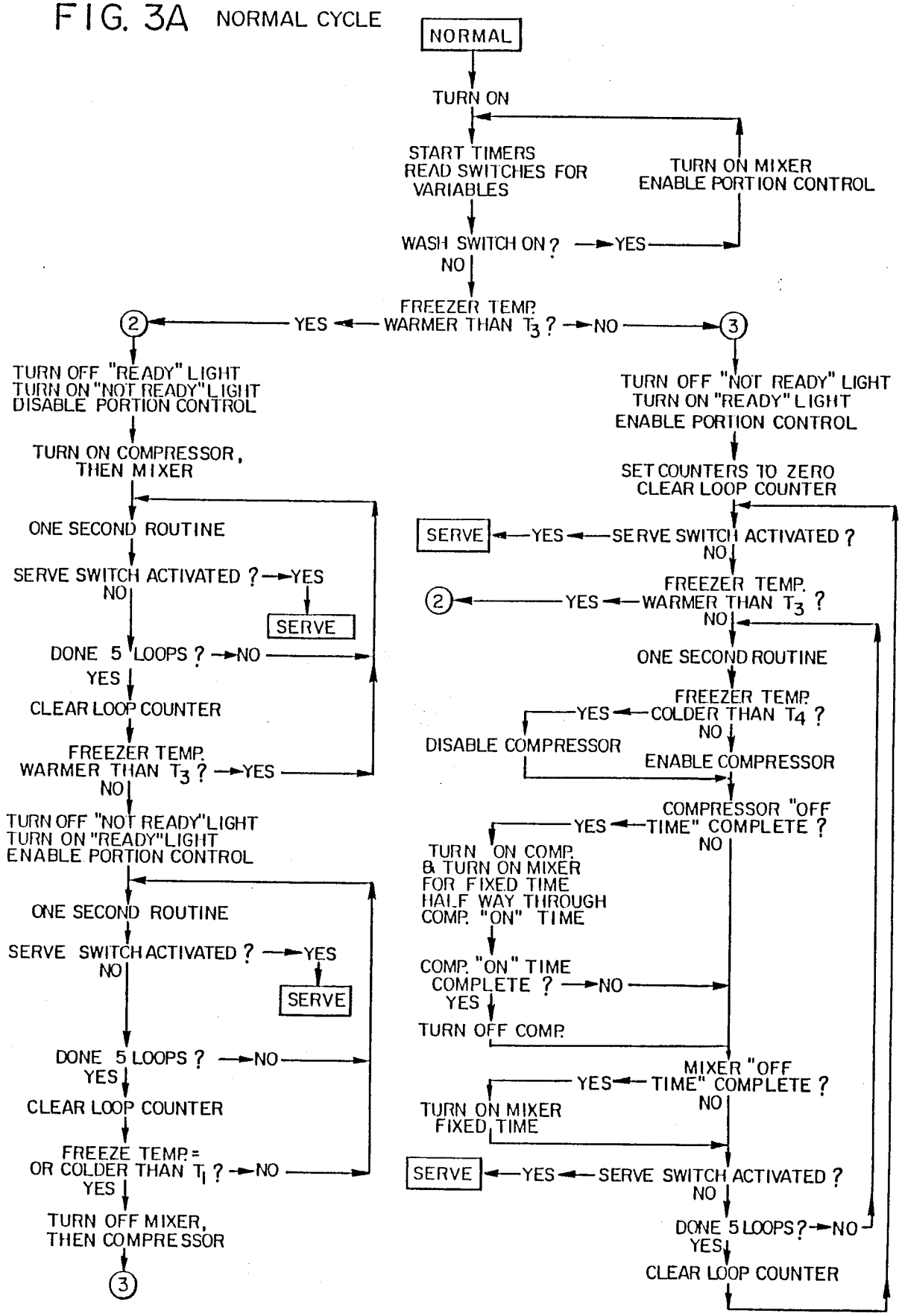
FIG. 3A NORMAL CYCLE

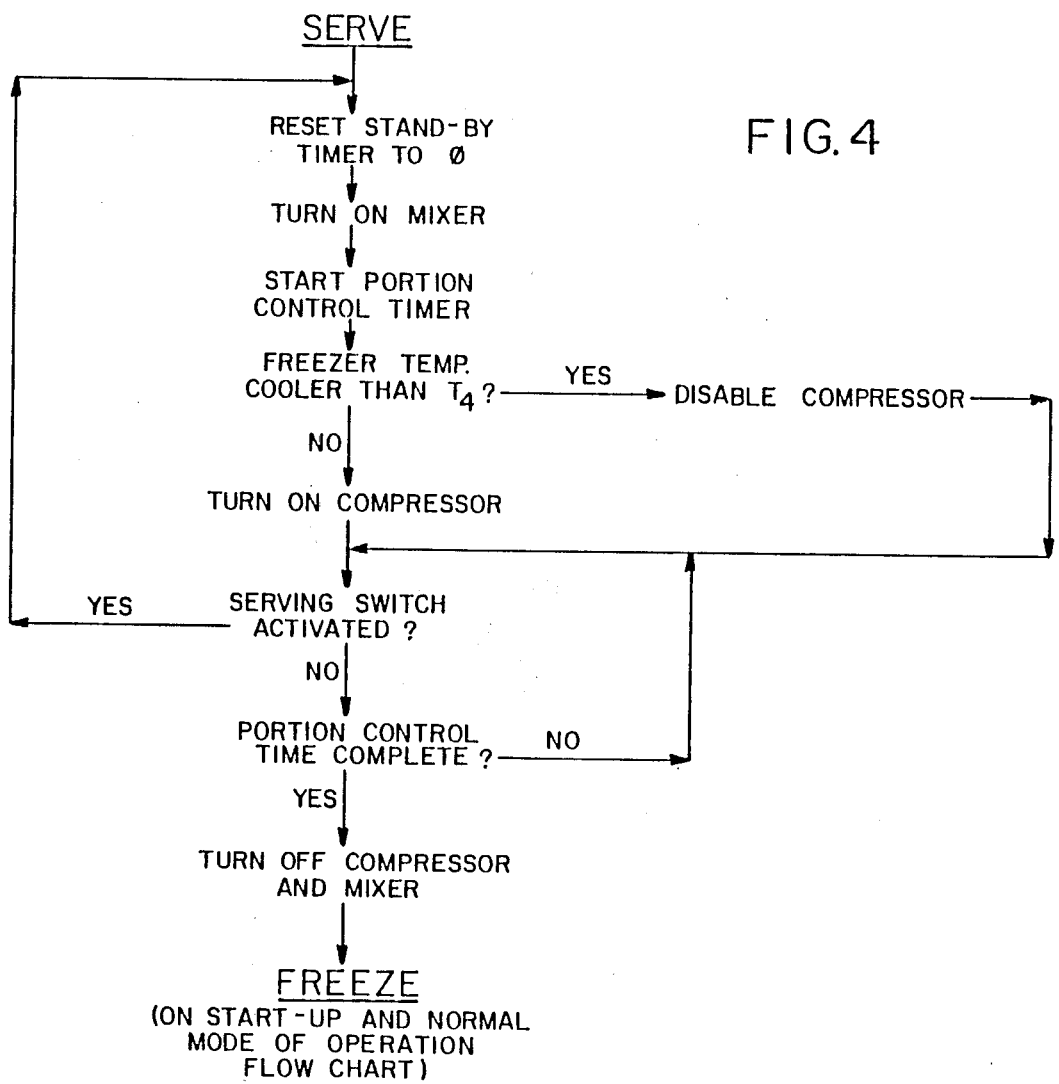

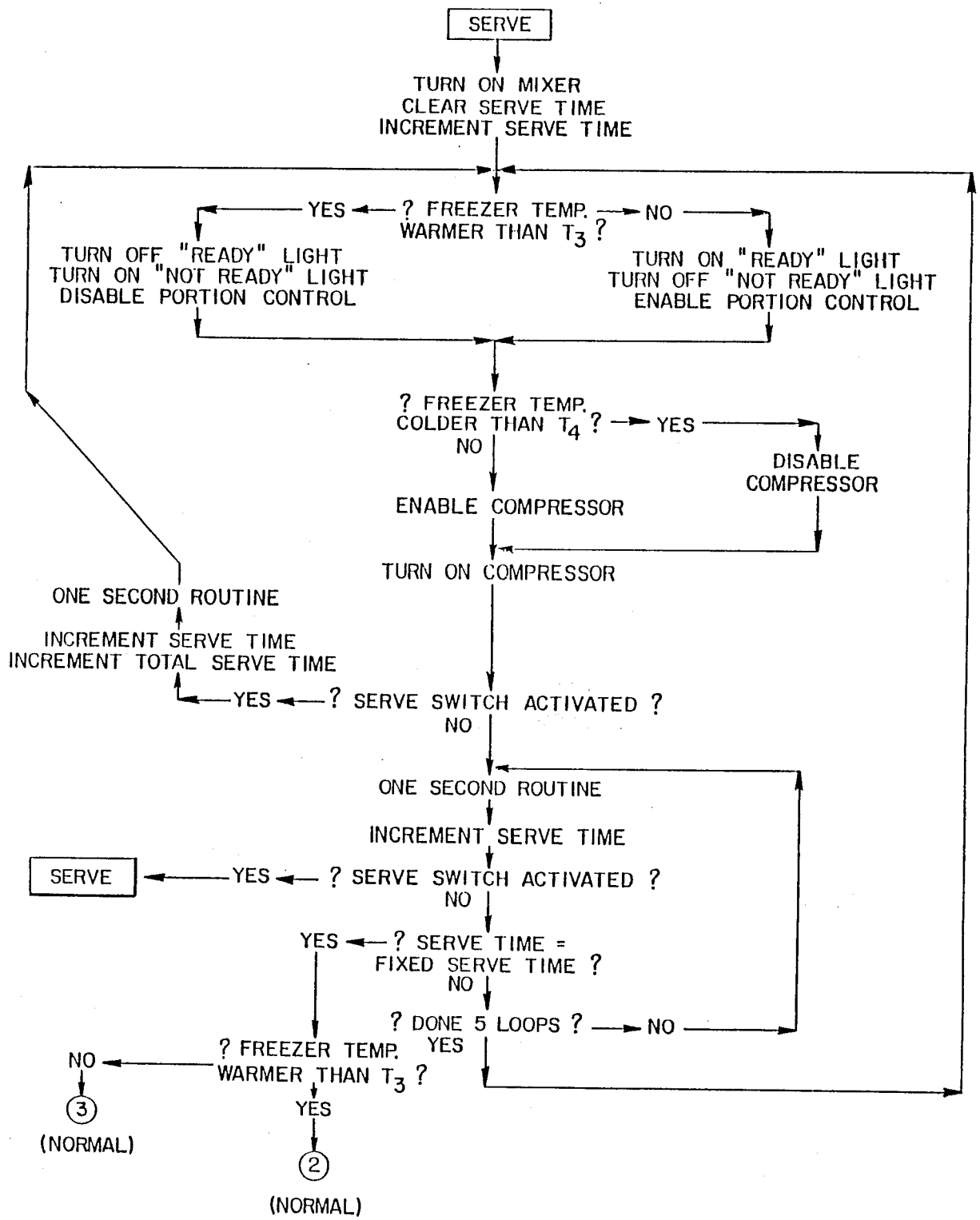

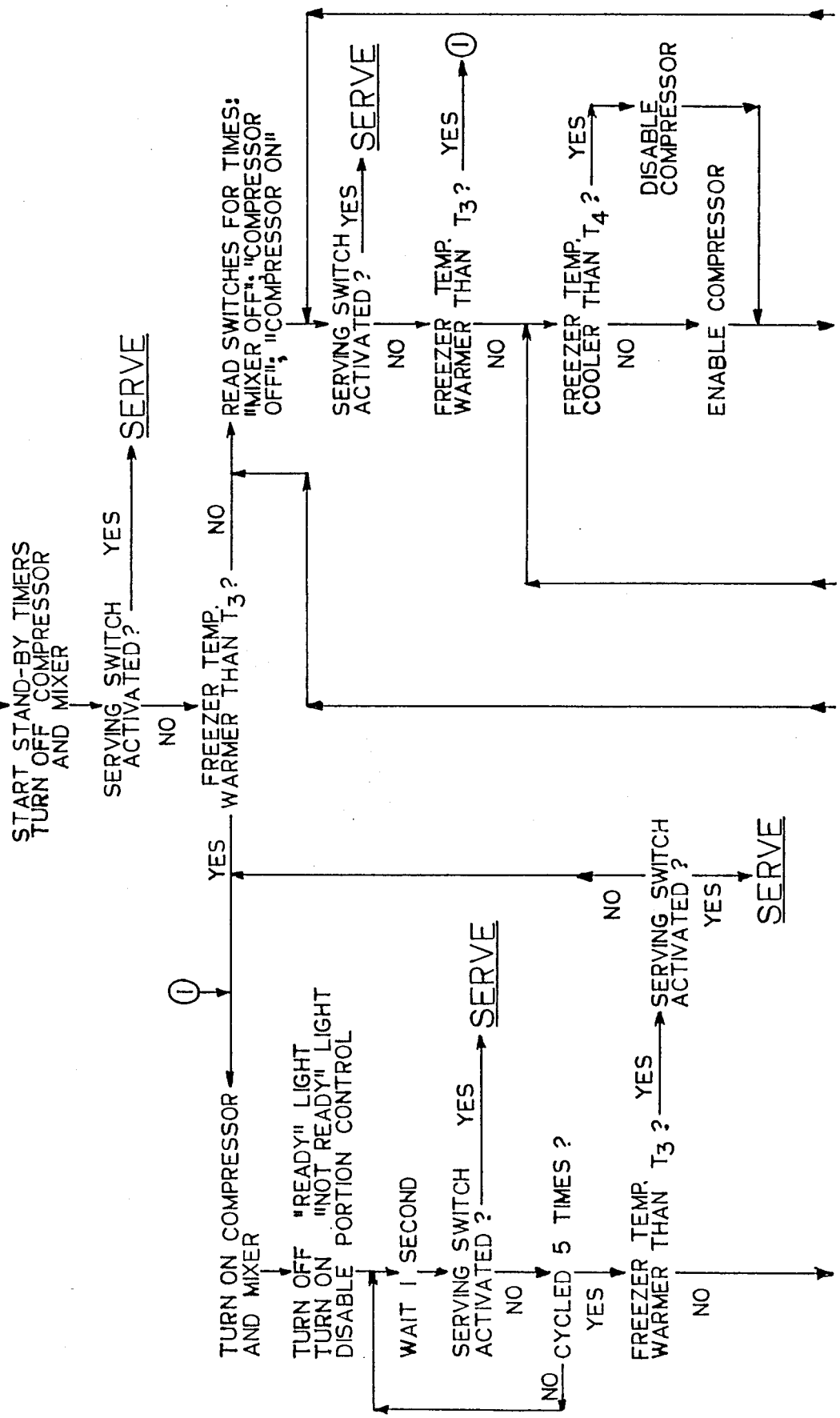

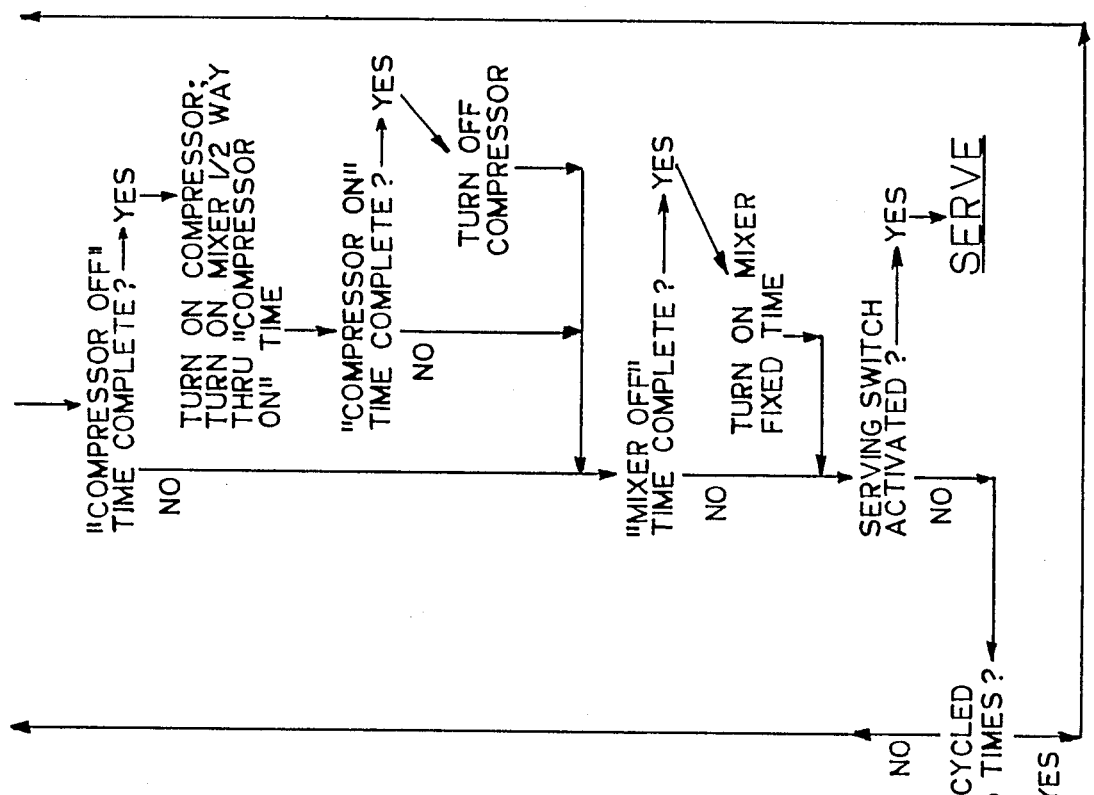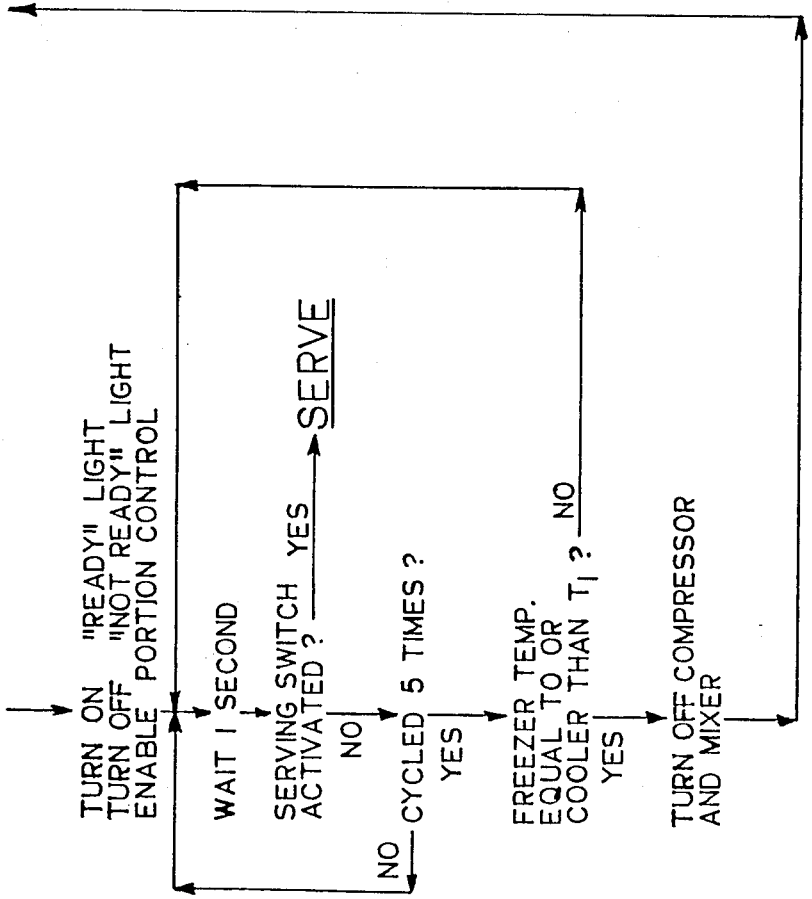
FIG. 5B

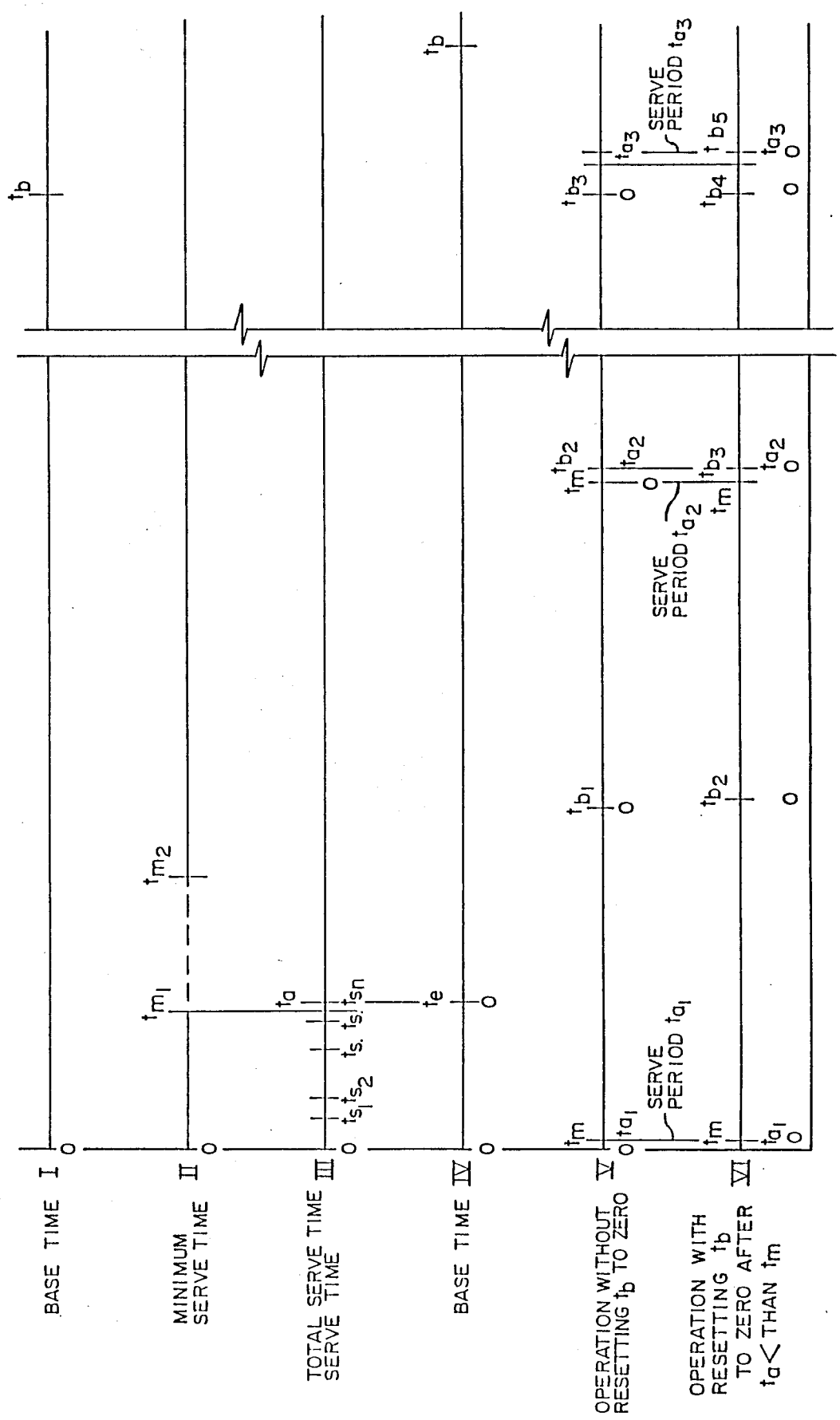

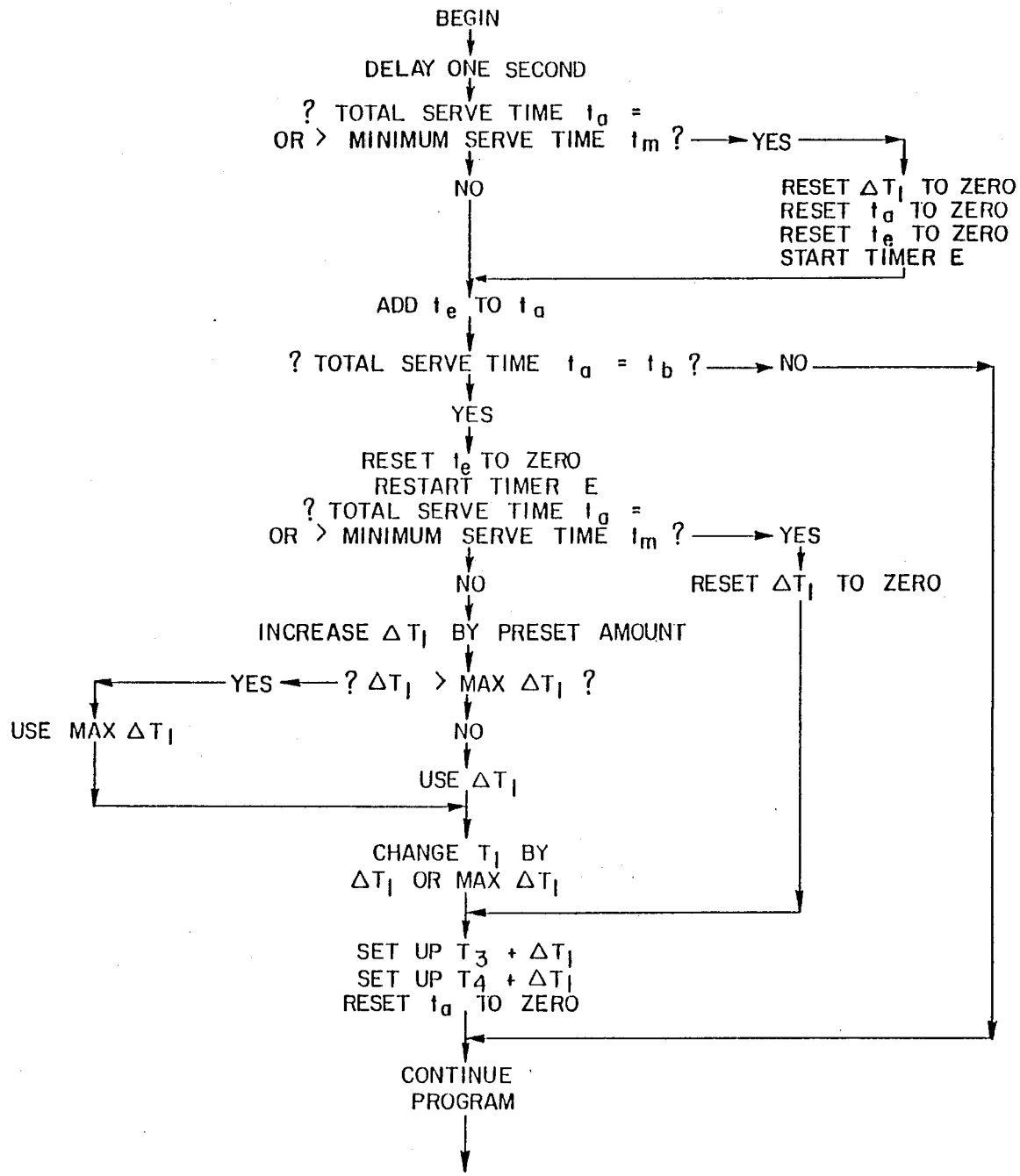

APPARATUS FOR MANUFACTURING SOFT ICE CREAM AND THE LIKE

This application is a continuation-in-part application of co-pending U.S. application Ser. No. 637,382 filed Aug. 2, 1984, now U.S. Pat. No. 4,551,025, issued Nov. 5, 1985 for APPARATUS FOR MANUFACTURING SOFT ICE CREAM AND THE LIKE, of the same inventor hereof.

BACKGROUND OF THE INVENTION

The present invention relates to improvements in apparatus for manufacturing semi-frozen custard-like desserts, in general, and specifically to improvements in apparatus for manufacturing soft ice cream and the like from prepared liquid mixes.

The improvements described and claimed therein were made to a machine similar to that described in U.S. Pat. No. 4,463,572 and the prior art discussed therein is applicable hereto. However, the improvements described and claimed herein will be applicable to almost any machine for manufacturing soft ice cream, providing suitable modifications were made to adapt the present invention to the specific structures of such machines. Those skilled in the art will recognize that the benefits of the present invention would attach to any machine incorporating it, without detracting from its novelty and usefulness.

Among the problems encountered with existing soft ice cream machines is a tendency for them to "freeze up" when numerous small portions are being served. Many machines turn on the refrigeration compressor and beater when portions of product are served to compensate for the rise in temperature that takes place as new, warmer premix is released from a reservoir into the freezing chamber. Those skilled in the art know that the product nearest to the dispensing spigot will be substantially cooler than that closest to the inlet from the reservoir into the freezing chamber and, if numerous small servings are dispensed, the freezing process will be continuous and the product in the freezing chamber will have a tendency to freeze into a solid mass. When this happens, either the machine must be shut off until this frozen material has softened, or some provision must be made to heat this portion to prevent if from solidifying. If the machine is set to avoid this problem, during periods of infrequent servings the machine will serve ice cream which is insufficiently frozen.

Another problem encountered with existing machines relates to those extended periods when no product is served. Some makers of these machines have incorporated a switch which will place the machine into a standby condition which reduces the amount of mixer agitation during such periods. However, it is easy to forget to operate the switch, either to place it into standby condition, or to place it back into normal condition.

A further problem relates to conditions encountered when serving numerous large portions. Under these conditions, the freezing mechanism may not be able to keep pace with the serving demands and the product begins to exhibit characteristics of inadequate freezing. If the freezing capabilities are set to handle this problem, the machine will freeze up during extended periods of non-use or, conversely, of producing many small servings, as hereinbefore described.

An additional problem of existing machines relates to the tendency of soft ice cream to "age", or become less palatable, during periods of low use. This tendency can be minimized by maintaining the consistency of the mix in one of several ways, e.g., reducing its temperature. However, busy service personnel have little time to enticipate periods of unusual demand and make the required machine adjustments. The preferred embodiment of the present invention specifically addresses this problem and its solution.

These and other problems are solved by the novel improvements herein described and claimed, as will be recognized by those skilled in the art.

SUMMARY OF THE PRESENT INVENTION

The present invention comprises improvements found to be useful as applied to soft ice cream manufacturing machines of the type described in U.S. Pat. Nos. 3,898,858 to Erickson, 4,383,417 to Martineau, 4,436,527 to Brown, Jr. and 4,551,025 to Ames and Brown, Jr., co-pending with the present application.

The primary objective of the preferred embodiment is to minimize "aging" of the product mix by maintaining its consistency during periods of unusual demand. It does this by reducing mix temperature form a preferred level following low use periods, and by raising the temperature toward the preferred level when the demand exceeds a preset amount.

A primary objective of the present invention is to prevent "freeze-up" of the freezing chamber of a soft ice cream machine, by providing a controller which is provided with temperature information from a temperature sensor, and which senses when the temperature of the ice cream is approaching a temperature which could bring about freeze-up and disable the compressor until the mixture warms up a selectable amount.

A further objective is to provide a controller for a soft ice cream manufacturing machine which automatically switches the refrigeration compressor and the mixer and auger to a standby condition when the controller senses that the dispensing spigot has not been actuated for some time. This keeps the mix within a desirable range of temperatures, and saves energy.

A still further objective is to provide a controller for a soft ice cream machine which senses when the temperature of the ice cream in the freezing chamber is approaching a temperature which would give an inadequately frozen product unacceptable to consumers. When such a condition occurs, the controller not only actuates the compressor and mixer-auger, but disables an optional portion control means until the temperature of the mix has been cooled to an acceptable level, reducing waste of both energy and product.

Still further objectives, features and advantages of the present invention will be more readily understood upon consideration of the following detailed description of the invention taken in conjunction with the accompanying drawings.

BRIEF DESCRIPTION OF THE DRAWINGS

FIG. 3 is a flow chart of the operation of the controller means of one embodiment of the present invention during the START-UP AND NORMAL mode of operation.

FIG. 3A is a flow chart of the operation of the controller means of the preferred embodiment of the present invention during the novel NORMAL CYCLE of operation.

FIG. 4 is a flow chart of the operation of the controller means of one embodiment of the present invention during the SERVE mode of operation.

FIG. 4A is a flow chart of the operation of the controller means of the preferred embodiment of the present invention during the novel SERVE CYCLE of operation.

FIGS. 5A and 5B are a flow chart of the operation of the controller means of one embodiment of the present invention during the STANDBY mode of operation.

FIG. 6 is a graphical representation of several important time periods and their relationships, useful in understanding the improved operation of the controller means obtained by use of the preferred embodiment of the present invention.

FIG. 7 is a flow chart of the operation of the controller means of the preferred embodiment of the present invention during a novel sub-routine, the ONE SECOND routine, of the cycles of operation depicted in the flow charts of FIGS. 3A and 4A.

DETAILED DESCRIPTION OF THE PRESENT INVENTION

Figures 1, 2:
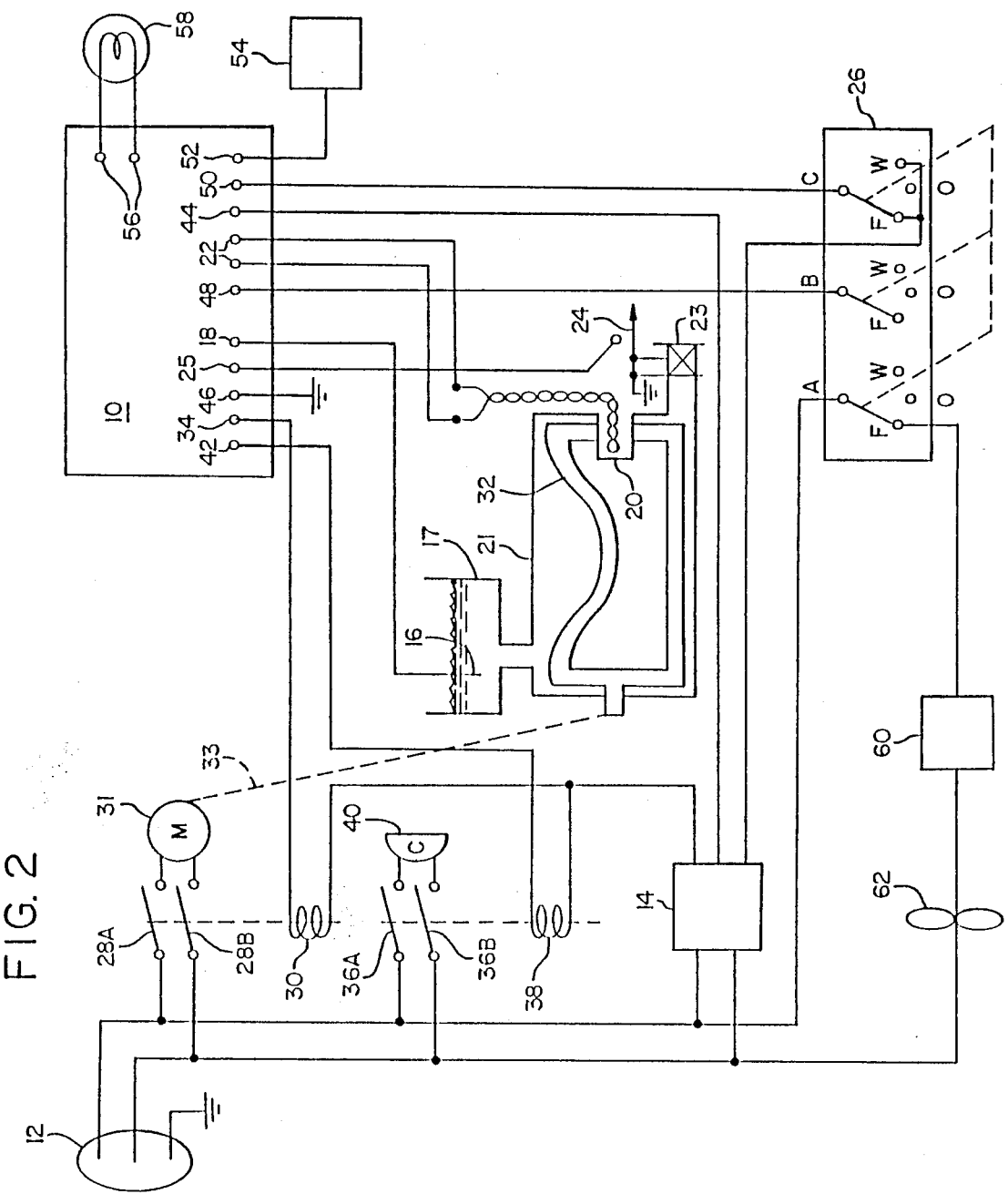
FIG. 1 is a graphical representation of several important temperatures useful in understanding the improved operation obtained by use of the present invention.
FIG. 2 is a highly schematic, structural and wiring diagram of the present ivnention.

Turning now to FIG. 1, we see a graphical representation of several temperatures which are important to an understanding of the advantages of the present invention.

Temperature T1 is the temperature at which it is desired to serve the soft ice cream product. Temperature T2 is the temperature at which it is desired the refrigeration compressor (hereinafter "compressor") and the mixer-auger (hereinafter "mixer-auger", "mixer" or "auger", according to the context) be actuated to obtain a desirable product acceptable to most customers. Temperature T3 is the warmest temperature at which it is desired the product should be served. Temperature T4 is the temperature below which it is desired the product should not go, to avoid "freeze-up" of the mixer-auger in the freezing chamber.

Temperature T1 is adjustable and is set according to local preferences as to coldness and/or consistency, or according to the product being manufactured.

Temperature T2 is set by the factory to be a constant difference warmer than temperature T1.

Temperature T3 is set by the operator, accordingly to local preference or the product being produced.

Temperature T4 is set by the factory or the operator to avoid freeze-up, and can be adjusted, if necessary.

Temperature T1 is set accordingly to local taste and/or product requirements, for example, at 6.8° C. or 19.76° F. Temperature T2 would then be, by factory presetting, −6.6° C (20.12° F.), and the controller means 10, hereinafter described in greater detail, would actuate the compressor and mixer when the soft ice cream in the freezer warmed up to this temperature.

The operator may know, from personal knowledge of the preference of his customers that, for a given product mix, the temperature (and consistency) obtained at, for example, −6.0° C. (21.2° F.) are most acceptable. Therefore, he would set the temperature T3 at that temperature, by whatever convenient means may be provided for that purpose as, for example, the use of switches or by entering that temperature into the memory of the controller means.

Temperature T4 would normally be set by the factory at a setting, for example, of 0.8° C. (1.44° F.) colder than temperature T1, which would be −7.6° C. (18.32° F.) representing the coldest temperature that most frozen mixtures can assume without congealing into a solid, unmanagable mass. However, in the preferred embodiment even this can be adjusted to an even colder temperature when dealing with unusual mixtures or conditions, for example, 1.5° C. (2.7° F.) colder than T1, or −8.3° C. (17.06° F.).

The aforementioned temperatures and temperature differentials are illustrative, and are not means to be limiting or definitive, as those skilled in the art will recognize, local conditions, local preferences, and different products may require different values than those mentioned.

FIG. 2 illustrates, in a highly schematic manner, the wiring diagram and essential mechanical structure of the present invention. Controller 10 is the heart of the present invention, receiving energy from any convenient source, such as AC mains voltage, at input 12. Transformer (and power supply) 14 provides appropriate voltage levels to operate the circuits and other devices of the invention. The level sensor 16 is located in the pre-mix reservoir 17, and is connected to controller means 10 at terminal 18. Temperature sensor 20 is connected to a controller means 10 at terminal 22 and may be located as disclosed and claimed in U.S. Pat. No. 4,467,572. However, temperature sensor 20 may be located at any location where a reliable and accurate reading can be obtained of the temperature of the frozen product.

Serving switch 24 is located where it can be actuated by operation of the dispensor spigot 23, and is connected to controller means 10 at terminal 25.

Master switch 26A-C has three positions: "O" (off), "F" (freeze), and "W" (wash), and is at "O" (off) position when the unit is not operating.

Switch 28A-B is operated by relay 30 at a signal from controller means 10 and provides energy to operate motor 31 drivingly connected, as indicated by dashed line 33, to mixer-auger 32. It is connected to controller means 10 at terminal 34.

Switch 36A-B is operated by relay 38 at a signal from controller means 10 and provides energy to operate compressor 40. It is connected to controller means 10 at terminal 42.

The secondary winding of transformer and power supply 14 is connected at one terminal to relays 30 and 38; at another terminal to the switched poles of switch 26C; and at the third terminal to terminal 44 of controller means 10. The D.C. output connections of transformer and power supply 14 are not shown as they are not necessary to an understanding of this invention.

Terminal 46 of controller means 10 is connected to system ground; terminal 48 is connected to the common pole of switch 26B; terminal 50 of controller means 10 is connected to the common pole of switch 26C; terminal 52 of controller means 10 is connected to portion control means 54; and output terminals 56 of controller means 10 are connected to indicator light 58, which signals when the reservoir 17 needs to be replenished.

Portion control means 54, although not a part of the present invention and therefore not shown in detail in FIG. 2, should be described to further reveal the range of functions controlled by controller means 10. Portion control means 54 includes a timer which gives a selection of several times during which the frozen product will be served, determining whether small, medium or large portions will be served, depending upon customer preference. Each setting is adjustable, and permits rather precise control of the amount of product which will be served. In addition, an over-ride switch can be included in the preferred embodiment which permits the operator to shut off the operation no matter what time limits have been set. Further, and to the point of the present invention, the operation of portion control means 54 can be disabled by a signal from terminal 52 of controller means 10, as will be more fully described hereinafter.

The operation of controller means 10, connected as described hereinbefore, can best be understood by reference to FIGS. 3–5A and 5B, in conjunction with FIGS. 1 and 2.

START-UP AND NORMAL mode of operation can best be understood by reference to FIGS. 1, 2 and 3, the temperature chart, schematic, and flow chart for START-UP AND NORMAL operation, respectively. When electrical energy is applied to input 12, voltages of appropriate level are applied to controller means 10, various timers (not shown) are started, and various switch settings (not all of which are shown as they are not necessary to an understanding of the invention) are read by controller means 10 to determine operation, as will hereinafter become clear. The FREEZE-OFF-WASH switch 26A-C is checked to see whether it is in FREEZE or WASH position. If in WASH position, mixer motor 31 is actuated, and the other procedures necessary to cleanse the machine are followed. If switch 26A-C is in FREEZE position, controller means 10 checks temperature sensor 20 to see whether the temperature in the freezing chamber 21 is warmer than T3. If so, controller means 10 turns off a "READY" light and turns on a "NOT READY" light (both not shown, as they are not pertinent to an understanding of the invention, other than to illustrate the range of functions controller means 10 performs), and disables portion control means 54. If temperature sensor 20 indicates a temperature cooler than T3, the "READY" light is turned on, the "NOT READY" light is turned off, and portion control means 54 is enabled. Controller means 10 then proceeds to check whether temperature sensor 20 indicates a temperature warmer than T2 in the mixing chamber 21. If so, refrigeration compressor 40 and mixer 32 are actuated to bring down the temperature to the desired temperature T1. If, however, sensor 20 indicates a temperature cooler than T2, this step is bypassed. When sensor 20 indicates a temperature equal to or cooler than T1, controller means 10 turns off compressor 40 and mixer 32.

When serving switch 24 is actuated by operation of the dispensor spigot 23, whether manually or under the control of portion control means 54, controller means 10 goes into SERVE mode of operation, hereinafter described more completely. When controller means 10 determines that a certain time, for example, 20 minutes, has elapsed since serving switch 24 has been activated, controller means 10 goes into STANDBY mode of operation, hereinafter described more completely. If such a certain time has not elapsed since the activation of serving switch 24, controller means 10 reverts to the beginning, or the block labeled FREEZE, of the operational sequence just described in connection with the flow chart depicted in FIG. 3, and continues to recycle as therein described until diverted by one of the events therein identified.

As described hereinbefore, when serving switch 24 is activated, controller means 10 shifts into the SERVE mode of operation, which can best be understood by referring to FIG. 4, taken in conjunction with the temperature chart of FIG. 1 and the schematic of FIG. 2.

As serving switch 24 is activated, either manually or under control of portion control means 54, an automatic elapsed-time clock (not shown) contained within controller means 10 is reset to 0 time, to be reactivated when switch 24 is deactivated. This initiates another elapsed-time measurement, mentioned hereinbefore, which determines whether controller means 10 will go into the STANDBY mode of operation as hereinafter described. following resetting of the elapsed-time clock, mixer-auger 32 and compressor 40 are activated, to prevent warmer product mix, entering the freezer chamber 21 to replace the frozen product being withdrawn to serve to a customer, from warming up the product still contained in the freezing chamber to an unacceptable temperature T3. At the same time, if the portion control means 54 was activated, the serving timer (not shown) within means 54, will operate until the desired amount of frozen product has been dispensed. The auger 32 pumps the frozen product out through the dispenser splgot into a container. During this time, temperature sensor 20 is constantly indicating the temperature of the product mix, so that it does not become colder than temperature T4, in which case compressor 40 is disabled, to prevent a freeze-up.

Although a freeze-up is not likely to occur during serving, it could happen. During periods when many small portions of product are being served, the compressor 40 may be operating continuously, and the temperature can very easily go so low that the mix in the freezing chamber 21 can freeze into a solid mass. To prevent this from happening, if temperature sensor 20 indicates a product temperature cooler than T4, controller means 10 disables compressor 40 until sensor 20 indicates a temperature warmer than T4 in the freezing chamber 23, when compressor 40 is enabled so that it can be actuated if required.

The dispenser spigot 23 continues open until the operator closes it or the timer within portion control means 54 indicates that the desired portion has been served, at which time the dispenser spigot 21 is closed, the elapsed-time indicator of controller means 10 is started, mixer-auger 32 is turned off, and compressor 40 is turned off. Controller means 10 reverts to the normal cycle as depicted in the flow chart in FIG. 3, at the point labeled FREEZE.

If the elapsed-time indicator within controller means 10 indicates that a pre-set period has elapsed, for example 20 minutes, since serving switch 24 has been activated, controller means 10 goes into STANDBY mode of operation in accordance with the flow chart depicted in FIGS. 5A and 5B. At this time, standby timers (not shown) within controller means 10 are activated, and compressor 40 and mixer 32 are turned off, if they have been operating. If serving switch 24 is activated by use of the dispenser spigot 23 or portion control means 54 at any time during STANDBY mode, controller means 10 reverts to SERVE mode of operation. If, however, serving switch 24 is not activated, controller means 10 checks the temperature of the product mix indicated by sensor 20. Depending upon the temperature indicated, controller means 10 goes into either a first cycle of operation, or a second cycle of operation, as hereinafter described and referred to.

If temperature sensor 20 indicates a product mix temperature cooler than temperature T3, controller means 10 goes into the said first cycle of operation. Controller means 10 sets into operation three separate timers (not shown) located within controller means 10; a "mixer off" timer; a "compressor off" timer; and a "compressor on" timer. These can be set by the operator by means of manually operated switches (not shown) according to past experience with the ambient temperature, the product mix, customer preference, and similar factors.

At this point in STANDBY mode of operation begins a first loop of operation, to be described and referred to hereinafter. Controller means 10 then checks to see whether serving switch 24 has been activated: if so, controller means 10 then checks to see if the temperature of the product mix, as indicated by sensor 20, is warmer than T3; if so, controller means 10 goes into said second cycle of operation, as mentioned hereinbefore and hereinafter described.

The next step of said first cycle of operation commences a second loop of operation, as hereinafter described and referred to. If sensor 20 indicates that the product mix is cooler than T4, controller means 10 disables compressor 40 until the sensor 20 indicates that the temperature of the product mix is warmer than T4, at which time controller means 10 enables compressor 40. "Enabling" compressor 40 does not mean actuating it, but merely making it possible to be actuated should conditions indicate, as hereinafter described. Controller means 10 then checks to see whether the "compressor off" timer has completed its preset period: if so, compressor 40 is actuated for the "compressor on" time and mixer 32 is actuated for a pre-set shorter period about one-half way through the "compressor on" period; if not, controller means 10 checks to see whether the "mixer off" timer has completed its preset period: if so, mixer 32 is actuated for preset time; if the "mixer off" period has not been completed, controller 10 checks to see whether serving switch 24 has been activated: if so, controller means 10 goes into SERVE mode of operation.

If serving switch 24 has not been activated, controller means 10 checks to see whether said second loop of operation has been performed five times: if not, it is performed again, if so, controller means 10 repeats said first loop of operation, as hereinbefore mentioned. This first loop of operation is repeated until controller means 10 detects that serving switch 24 has been activated, which reverts controller means 10 to SERVE mode of operation.

If controller means 10 detects that temperature sensor 20 indicates a temperature warmer than temperature T3, controller means 10 goes into a second cycle of operation as mentioned hereinbefore and now described.

When sensor 20 indicates a temperature warmer than 13, controller means 10 actuates compressor 40 and mixer 32. The "READY" light is extinguished and the "NOT READY" light is turned on. Portion control means 54, if used, is disabled. After a one second wait, controller means 10 checks to see if serving switch 24 is activated; if so, controller means 10 goes into SERVE mode of operation; if not, controller 10 checks to see whether the serving switch has been checked five times; if not, controller means 10 waits another second and rechecks. If the state of serving switch 24 has been checked five times, controller means 10 checks sensor 20 to see if the temperature of the product mix is warmer than 13; if so, controller means 10 checks to see whether serving switch 24 has been activated manually, the portion control having been disabled as hereinbefore described: if so, controller 10 goes into SERVE mode of operation. If serving switch 24 has not been activated manually, controller means 10 reverts to the beginning of the second cycle of operation, as hereinbefore described.

When controller means 10 checks to see if sensor 20 indicates a product mix temperature is warmer than T3, if it does *not* find such a temperature, that is, if it finds a temperature equal to or *cooler* than T3, controller means 10 extinguishes the "NOT READY" light; turns on the "READY" light; and enables portion control means 54.

Following these operations, controller means 10 then goes into another five second period of checking the operation of serving switch 24 each second, as hereinbefore described. If, after five times of checking, the serving switch 24 has *not* been activated, controller means 10 checks sensor 20 to see whether the temperature of the product mix is equal to or colder than temperature T1: if so, compressor 40 and mixer 32 are turned off, and controller means 10 goes into the first cycle of operation as hereinbefore described. If sensor 20 indicates the temperature is *not* equal to or cooler than T1, controller means 10 goes back through the five second cycle of checking to see whether serving switch 24 has been activated. This recycling is repeated until the temperature is indicated to be equal to or colder than T1, when controller means 10 goes into the first cycle of operation as described hereinbefore.

Whenever the level of unfrozen product mix in the reservoir 17 falls below a preset level, as indicated by the voltage supplied to controller means 10 at terminal 18 by detector 16, controller means 10 actuates indicator light 58, indicating the need to replenish the reservoir 17.

Whenever the temperature within the cabinet housing the freezer unit rises above a certain preset limit, thermostat 60 closes, actuating fan motor 62 to hold the internal temperature within desired limits.

The preferred embodiment of the present invention is for the purpose of maintaining a high quality product mix under serving conditions of widely varying usage rate. It is well-known to those skilled in the art that during periods of low usage rate, the product mix may become over-beaten, giving it a lower consistency which reduces its attractiveness to consumers. This condition can be overcome, of course, by reducing the amount of mixing given during such periods, according to experience and/or other factors.

Returning to FIG. 1, we will be better able to explain the preferred embodiment of the present invention now to be described.

Temperature T1, in the preferred embodiment, is reduced incrementally as the usage rate declines below a preset level, to be explained more fully hereinafter.

Temperature T2 is not operative in the preferred embodiment, its role being assimilated into the novel sub-routine described hereinafter.

Temperature T3, in the preferred embodiment, is reduced incrementally, in step with T1, as the usage rate declines.

Temperature T4, in the preferred embodiment, is also reduced incrementally in step with T1, as the usage rate declines.

The incremental steps by which the controller means 10 reduces temperatures T1, T3, and T4 during periods of reduced usage, according to the preferred embodiment, can also be adjusted by the operator, according to experience and other factors.

Temperature T1 can be adjusted downward, according to the teachings of the present invention, in incremental steps $\Delta T1$, to a maximum downward adjustment of max $\Delta T1$. In the preferred embodiment, the values of the steps $\Delta T1$ can be adjusted to be 0.0° C., 0.1° C., 0.2° C. or 0.3° C., with the maximum cumulative change max $\Delta T1$ being 0.8° C. or 1.2° C., as desired.

Temperature T3 can be adjusted downward according to the teachings of the present invention, in incremental steps equal to $\Delta T1$, to a maximum downward adjustment equal to max $\Delta T1$.

Temperature T4 would normally be set by the factory at a setting, for example, of 0.8° C. (1.44° F.) colder than temperature T1, which would be −7.6° C. (18.32° F.), representing the coldest temperature that most frozen mixtures can assume without congealing into an unmanageable, solid mass. Provisions are provided for adjusting even this to a colder temperature when dealing with unusual mixtures or conditions, for example, by 1.5° C. (2.7° F.) colder than T1, or to −8.3° C. (17.06° F).

Temperature T4 can also be adjusted downward, according to the teachings of the present invention, in incremental steps equal to $\Delta T1$, to a maximum downward adjustment equal to the maximum $\Delta T1$.

The aforementioned temperatures and temperature differentials are illustrative, and are not meant to be limiting or definitive, as those skilled in the art will recognize. Local conditions, local preferences, and different products may require different values than those given.

Turning now to FIG. 6, we see a graphic representation of several periods which are important to an understanding of the operation and benefits of the present invention.

Period $t_b$ is a base period which is the basis for determining the usage rate, or duty cycle, of the apparatus. $t_b$ is fixed in a given machine.

Period $t_e$ is the elapsed time during base time $t_b$.

Period $t_m$ is the approximate time required to empty the freezing chamber of the machine, and varies according to the product mix being processed. $t_m$ is entered into the controller by switch setting at the time the product mix is changed.

Period $t_a$ is the sum of the cumulative time the serve handle has been raised.

Period $t_f$ is a fixed time after the serve handle is lowered during which the mixer continues to operate, for the purpose of combining the warmer liquid mix from the reservoir 17 with the frozen mix remaining in the freezing chamber, to replace that withdrawn by the operation of the dispenser spigot. During period $t_f$, compressor 40 may also come on, if the temperature of the frozen mix is warmer than T4, as hereinafter described more completely.

The duty cycle (or usage rate) is determined by the ratio of $t_a$ to $t_b$, that is, by serving time accumulated during the base period divided by the base period. Although the duty cycle, as such, is not used as a mathematical quantiy in this machine, except in a very limited sense as will be explained more fully hereinafter, the concept is a very useful one in discussing the operation of the machine. However, the way in which the machine actually operates will be described in detail, as well as claimed.

Period $t_b$ is actuated by several events: by turning on the machine in NORMAL mode of operation; by the termination of a preceding base period, $t_b$; or by the completion of a period $t_a$ equal to or greater than period $t_m$, as hereinafter more completely explained. The time $t_e$ that has elapsed since the beginning of $t_b$ is measured by timer E.

Period $t_f$ is initiated when dispenser spigot 25 is deactivated, thereby deactivating serve switch 24. Period $t_f$ runs for a fixed period to permit the mixer 31 to combine the unforzen mix from the reservoir with the frozen mix still remaining in the freezer. $t_f$ is timed by timer t.

Period $t_a$ is obtained by accumulating the individual time that the dispenser spigot is activated. $t_a$ is accumulated until it equals or exceeds $t_m$, at which time it is reset to zero (0), and is restarted when the dispenser spigot is next actuated. $t_a$ is accumulated by the timer A.

Period $t_b$, or base time, is the period during which a batch can remain in the freezer at the temperature T1 without any detectable deterioration in quality. In the preferred embodiment, it is 2 hours. This can be adjusted by the factory.

Period $t_m$, or minimum serve time, is the approximate time required to empty the freezer of a given batch of product mix. In the preferred embodiment, and depending upon the type of product being processed, this time ranges from 45 to 90 seconds.

Period $t_a$ is the accumulated sum of the individual serving times of dispenser switch 23. Whenever $t_a$ equals or exceeds $t_m$, the conditions have been met for serving a barrel full of frozen mix and $t_e$ and $t_a$ are reset to zero (0), that is, time base $t_b$ is restarted.

Period $t_f$ is the time after dispenser spigot 23 has been closed and serving has stopped, that mixer 52 is kept running to mix the warmer mix from the reservoir with the frozen mix remaining in the freezer/barrel 21. In the preferred embodiment, $t_f$ can be varied from 25 to 40 seconds, according to product mix.

As stated hereinbefore and now to be explained in detail, the present invention reduces the temperatures T1, T3, and T4 incrementally as the usage rate, or duty cycle, declines, and restores them to their original levels whenever the duty cycle exceeds a present value, depending upon how the machine is used. Account is taken as to whether the use occurs early or late in the base period; whether it occurs all at once or over an extended period less than the base period; and the type of product mix being processed.

More specifically, the predetermined base period $t_b$ is set into controller means 10 at the factory: in the preferred embodiment, this base time is two hours, although it could be greater or less. During the base time, the amount of time $t_a$ serving switch 24 is actuated is accumulated, and when time $t_e$ equals the time $t_b$, controller means 10 reduces T1 by $\Delta T1$, in accordance with the preset choices as hereinbefore described. This action continues until one of two events occurs: either $t_a$ exceeds the time $t_m$, in which case controller means 10 restores the temperature of the product mix to T1; or T1 reaches max $\Delta T1$, as described hereinbefore, where it remains until $t_a$ equals or exceeds $t_m$, in which case controller means 10 restores the temperature T1 to its original level.

The time $t_m$ is selected on the assumption that if one full mixing-chamber full of product mix is served during a base period, no change in temperature is needed to maintain a fresh taste and acceptable consistency in the next serving batch during the next base period. If, however, less than one mixing-chamber full has been served, the temperature is reduced by $\Delta T1$ at the end of the base period.

It will be seen by those skilled in the art that certain conditions could cause substantially more than one base period to elapse before a needed temperature adjustment is made if the needed temperature adjustments were to be made only at the end of each base period. Consider, for example, the situation where the freezing chamber were emptied (and automatically refilled) shortly after the beginning of a base period. At the end of that base period, the controller means would check to see if the required amount of product mix had been served during that time. Finding that it has so been served, no adjustment in temperature would be made. If, then, in the hypothetical situation we are considering, no more servings were to be made until the last couple of minutes in the next serving period, it will immediately be seen that nearly two full base periods will have passed without any temperature adjustment being made, precisely the situation we wished to avoid.

It is for this reason that controller means 10 is programmed to restart the base period whenever it detects that the cumulative serving time has been equalled or exceeded. Thus, the base period being used to calculate the duty cycle is always "Fresh", that is, the maximum time permitted to elapse before a needed temperature correction is made will never be more than one base period (see chart IV, FIG. 6).

To illustrate the advantage of this feature, consider the situation (chart V) where demand is very low, but intense when it occurs: for example, $t_{a\,1}$ is greater than $t_m$ very near to the beginning of base period $t_{b\,1}$ and nearly at the end of $t_{b\,2}$, but not again until well into base period $t_{b\,4}$. Under these conditions, if controller means 10 did not reset base timer B when $t_{a\,1}$ was greater than $t_m$, the product mix would not be reduced in temperature until the end of base period $t_{b\,3}$. However, with the resetting feature of the present invention, base period $t_{b\,1}$ would be reset to zero immediately at the end of $t_{a\,1}$ to start base period $t_{b\,2}$ and controller means 10 would reduce T1 by $\Delta T1$ at the end of base period $t_{b\,2}$, restore it to T1 at the end of $t_{b\,3}$, but reduce it by $\Delta T1$ at the end of $t_{b\,4}$, and again restore it to T1 at the end of $t_{b\,5}$ (see chart VI).

It will be seen that under this mode of operation, incorporating the feature of resetting the base period to zero (0) whenever $t_a$ is greater than $t_m$, and under the demand conditions described, the temperature of the product mix will be reduced when it needs it—between serving period 1 and 2—but not when it doesn't need it—following serving period 3—, as would have been the case without the resetting feature. Thus it functions to provide a higher quality product during periods of low demand, but conserves energy during periods of high demand or immediately following service beyond the minimum service time $t_m$.

Controller means 10 is therefore programmed in the present invention to:

1. Keep track of the time required to serve a freezing chamber-full of product mix, which can vary substantially, depending upon the product ($t_m$);

2. Accumulate the total ($t_a$) of the time increments serve switch 24 is actuated during the base period;

3. Determine when the desired duty cycle has been reached, that is, when accumulated serving time $t_a$ equals or exceeds $t_m$;

4. Adjust T1 downward by increments $\Delta T1$, when the duty cycle is less than desired, that is, when $t_a$ does not equal $t_m$; or upward to T1 when the duty cycle has been reached, that is, when $t_a$ equals or exceeds $t_m$, to increase the usable life and enhance the quality of the product mix; and 5. Reset the base period to zero (0) whenever a mixing chamber full or product mix has been served within the base period, thus ensuring that the duty cycle determination represents the most recent usage rate and making more accurate and effective the T1 adjustment, $\Delta T1$.

The operation of controller means 10 in the preferred embodiment and connected as described hereinbefore, can best be understood by reference to FIGS. 3A, 4A and 7 in conjunction with FIGS. 1, 2 and 6.

NORMAL cycle of operation in the preferred embodiment can best be understood by reference to FIGS. 1, 6, 2 and 3A the temperature and time charts, the schematic, and the flow chart for NORMAL cycle of operation, respectively. When electrical energy is applied to input 12, voltages of appropriate level are applied to controller means 10, various timers (not shown) are started, and various switch settings (not all of which are shown as they are not necessary to an understanding of the present invention) are read by controller means 10 to determine the parameters of operation, as will hereinafter become clear. The FREEZE-OFF-WASH switch 26A-C is checked to see whether it is in FREEZE or WASH position. If in WASH position, mixer motor 31 is actuated, portion control means 54 is enabled (which means that it can be operated, if required), and the other necessary procedures to cleanse the machine are followed. If switch 26A-C is in FREEZE position, controller means 10 checks temperature sensor 20 to see whether the temperature in the freezing/mixing chamber 21 is warmer than T3. It will be recognized that, to this point, the operation is the same as described in connection with FIG. 3, hereinbefore.

At this point NORMAL cycle of operation, controller means 10 goes into one of two routines: a FIRST ROUTINE if temperature sensor 20 detects a temperature warmer than T3, and a SECOND ROUTINE if the temperature in freezing/mixing chamber 21 (hereinafter called barrel 21 unless the context calls for a more precise identification) is equal to or cooler than T3.

In said FIRST ROUTINE, controller means 10 turns off said "READY" light, turns on said "NOT READY" light, disables said portion control means 54, and turns on compressor 40, then mixer-auger 32. At this point in said FIRST ROUTINE, controller means 10 initiates a cycle in connection with temperature T3 called, for convenience in reference hereinafter, T3 CYCLE, the first step of which is a novel sub-routine called, for convenience in reference hereinafter, ONE SECOND routine, which will be explained hereinafter in greater detail in connection with FIG. 7. Following said ONE SECOND routine, controller means 10 checks to see if serve switch 24 is actuated:

If so, controller means 10 goes into, SERVE cycle of the preferred embodiment, to be explained more completely hereinafter in connection with FIG. 4A;

If not, controller means 10 checks to see whether said T3 CYCLE has been performed five (5) times;
If not, controller means 10 returns to the start of said T3 CYCLE, each time checking after said ONE SECOND routine to see if said serve switch 24 has been actuated, until said T3 CYCLE has been completed five (5) times;
If so, controller means 10 checks sensor 20 to see the temperature in barrel 21 is warmer than T3;
If so, controller means 10 reverts to the start of said T3 CYCLE;
If not, controller means 10 turns off said "NOT READY" light, turns on said "READY" light, and enables portion control means 54.

At this point in said FIRST ROUTINE, controller means 10 initiates a cycle in connection with temperature T1 called, for convenience, T1 CYCLE, which includes said ONE-SECOND routine at the beginning. Following said ONE-SECOND routine in said T1 CYCLE, controller means 10 checks to see if serve switch 24 is actuated:
If so, controller means 10 goes into said SERVE mode of operation;
If not, controller means 10 checks to see if said T1 CYCLE has been performed five (5) times:
If not, controller means 10 returns to the start of said T1 CYCLE, each time checking after said ONE SECOND routine to see if said serve switch 24 has been actuated, until said T1 CYCLE has been completed five (5) times;
If so, controller means 10 checks sensor 20 to see if the temperature in barrel 21 is equal to or cooler than T1:
If not, controller means 10 reverts to the start of T1 CYCLE;
If so, controller means 10 turns off mixer-auger 32, then compressor 40, and goes into said SECOND ROUTINE, as will not be described in greater detail..

As stated hereinbefore, controller means 10 goes into said SECOND ROUTINE if the initial temperature measurement following start-up is equal to or cooler than T3. Controller means 10 thereupon turns off said "NOT READY" light, turns on said "READY" light, enables portion control means 54, and resets various internal counters to zero (0) (hereinafter explained in greater detail). At this point begins a FIRST SUB-ROUTINE of said SECOND ROUTINE, wherein controller means 10 checks to see if serve switch 24 is actuated:
If so, controller means 10 goes into said SERVE mode of operation;
If not, controller means 10 checks sensor 20 to see whether the temperature in barrel 21 is warmer than T3;
If so, controller means 10 reverts to said FIRST ROUTINE;
If not, controller means 10 goes into a SECOND SUB-ROUTINE of said SECOND ROUTINE, which commences with said ONE-SECOND routine. After going through said ONE SECOND routine, controller means 10 checks sensor 20 to see whether the temperature in barrel 21 is cooler than T4:
If so, controller means 10 disables compressor 40 (that is, prevents it from being actuated);

If not, compressor 40 continues in an enabled state (that is, it can be actuated if conditions call for it, but it is not *necessarily* actuated;
Controller means 10 then checks to see whether compressor off time is complete:
If not, controller means 10 goes to the next step of said SECOND SUB-ROUTINE of said SECOND ROUTINE, which is to check whether mixer-off time is complete:
If so, controller means 10 turns-off compressor 40, and turns-on mixer 32 about one-half way through compressor-on time, then checks to see if compressor-on time is complete:
If not, controller means 10 goes to said next step of said SECOND SUB-ROUTINE;
If so, controller means 10 turns off compressor means 40, then goes to said next step of said SECOND SUB-ROUTINE, which is to check if said mixer-off time is complete:
If so, mixer 32 is turned-on for a preset time;
If not, controller means 10 checks to see if serve switch 24 is actuated:
If so, controller means 10 goes into said SERVE mode of operation;
If not, controller means 10 checks to see if said SECOND SUB-ROUTINE has been performed five (5) times:
If not, controller means 10 reverts to the beginning of said SECOND SUB-ROUTINE and cycles therethrough until five (5) loops have been completed;
If so, controller means 10 reverts to the beginning of said FIRST SUB-ROUTINE of said SECOND ROUTINE, and continues to cycle therethrough until:
Serve switch 24 is actuated, in which case, controller means 10 goes into SERVE mode of operation; or
Sensor 20 detects a temperature warmer than T3 in barrel 21, in which case controller means 10 diverts into said FIRST ROUTINE.

Turning now to FIG. 4A, taken in conjunction with temperature and time charts, FIGS. 1, 6, and the simplified representation of the mechanical, electrical and electronic structure of FIG. 2, the SERVE cycle of operation can be analyzed and explained.

As stated hereinbefore, when serve switch 24 is actuated, either manually or under the control of portion control means 54, controller means 10 goes into said SERVE cycle of operation, turning on mixer-auger 32, clearing said serve timer E and adding into cumulative serve-time timer A the incremental time the dispenser 23 is actuated. A FIRST FEEDBACK LOOP and a SECOND FEEDBACK LOOP of said SERVE mode of operation, both discussed in greater detail hereinafter, return to this point, from which controller means 10:
checks to see whether sensor 20 detects a temperature in barrel 21 warmer than T3:
If so, controller means 10 turns off said "READY" light, turns on said "NOT READY" light, and disables portion control means 54;
If not, said controller means 10 turns on said "READY" light, turns off said "NOT READY" light, end enables portion control means 54;
Controller means 10 then checks to see whether sensor 20 detects a temperature cooler than T4:

If so, compressor 40 is disabled;
If not, compressor 30 is enabled;
Turns on compressor 40 if needed and enabled;
Checks to see if serve switch 24 is actuated:
  If so, controller means 10 goes into said FIRST FEEDBACK LOOP, adding into said accumulated time $t_a$ in time A the incremental timer dispenser switch 24 is actuated and comparing $t_a$ with $t_m$ as hereinbefore described. Controller means 10 then goes into said ONE-SECOND routine, following which it has completed said FIRST FEEDBACK LOOP, and continues said SERVE mode of operation as herein described;
  If not, controller means 10 enters an INCREMENT CYCLE of said SECOND FEEDBACK LOOP through said ONE SECOND routine, following which it increments $t_f$ and checks to see whether serve switch 24 is actuated;
    If so, controller means 10 reverts to the beginning of said SERVE mode of operation;
    If not, controller means 10 checks to see whether timer F has permitted mixer 32 to operate for timer F has permitted mixer 32 to operate for time $t_f$ after serve switch 24 has been deactivated:
      If so, controller means 10 turns off mixer 32, and then compressor 40 (if on), and returns to the beginning of NORMAL mode of operation at point 2 on the flow chart of FIG. 4A;
      If not, controller means 10 checks to see whether said INCREMENT CYCLE has been completed five (5) times:
        If not, controller means 10 reverts to the beginning of said INCREMENT CYCLE and cycles therethrough until five (5) cycles have been completed;
        If so, controller means 10 has completed said SECOND FEEDBACK LOOP, and continues said SERVE mode of operation as hereindescribed, until said serve switch 24 is actuated returning controller means 10 to the beginning of said SERVE mode of operation, or timer F has permitted mixer 32 to operate for a period $t_f$ after serve switch 24 has been deactuated, in which case controller 40 turns off mixer 32, then compressor 40 and returns to NORMAL cycle of operation, as hereinbefore described.

Turning now to FIG. 7, taken in conjunction with temperature and time charts, FIGS. 1 and 6, the novel sub-routine referred to several timer hereinbefore as said ONE-SECOND routine, will be explained and its advantages pointed out.

As controller means 10 enters into said ONE-SECOND routine, a time delay of one second occurs, after which controller means 10 checks to see whether accumulated serve time $t_a$ equals or exceeds the minimum serve time $t_m$:
  If not, period $t_e$ which has elapsed since timer E commenced running will be counted toward $t_b$, the base period;
  If so, controller means 10 resets $\Delta T1$ to zero (0), $t_e$ to zero (0), and $t_a$ to zero (0), then starts timer E running;
Controller means 10 then checks to see whether elapsed time $t_e$ equals base period $t_b$:
  If not, controller means 10 bypasses the balance of sub-routine ONE-SECOND routine, and returns to the point in the program from which it entered into said ONE-SECOND routine;
  If so, controller means 10 resets timer E to zero (0) and checks to see whether total serve time $t_a$ equals or exceeds the minimum serve time $t_m$:
    If so, controller means 10 resets $\Delta T1$ to zero (0), bypasses the next several steps of said ONE-SECOND ROUTINE, and sets a new temperature T1, a new temperature
    T3, a new temperature T4, and resets total serve time $t_a$ to zero (0), following which controller means 10 returns to the point in the program from which it entered into said ONE-SECOND routine;
    If not, controller means 10:
      Increases $\Delta T1$ by a preset amount and checks to see whether $\Delta T1$ is greater than max $\Delta T1$:
        If so, controller means 10 accepts max $\Delta T1$;
        If not, controller means 10 accepts $\Delta T1$; and
      Changes T1 by the accepted amount, either
    max $\Delta T1$ or $\Delta T1$; then
      Sets a new temperature T3, a new temperature T4, and reset total serve time $t_a$ to zero (0), following which controller means 10 returns to the point in the program from which it entered into said ONE-SECOND routine.

The preferred embodiment of the present invention maintains the consistency of the product mix during periods of unusual demand, and especially during periods of low demand. It does this by adjusting the temperature of the product mix downward in proportion to the demand level, i.e., by reducing the temperature from a preferred level T1 if the demand is lower than a preset amount, and by restoring it to or toward said preferred level T1 if the demand equals or exceeds said preset amount. By measuring the accumulated demand, i.e., by measuring the accumulated incremental serving times $t_a$ during a base period $t_{b1}$ and decreasing the temperature of the freezing chamber below said preferred level T1 by a preset amount $\Delta T1$ during each successive base period, $t_{b2}, t_{b3}, \ldots t_{bn}$, that the accumulated incremental serving times $t_a$ do not equal a certain preset time $t_m$, or by restoring the decreased temperature max $\Delta T1$, to or toward the preferred T1 level whenever the accumulated incremental serving time equals or exceeds said certain preset time, the desired consistency of the product mix is maintained. When the reduced temperature of the freezing chamber reaches a preset minimum level max $\Delta T1$, it will remain at that level as long as the accumulated incremental serving time $t_a$ in each base period $t_{b2}, t_{b3}, \ldots t_{bn}$, is less than said certain preset time $t_m$.

Further, when the accumulated incremental serving time $t_a$ equals or exceeds said preset certain time $t_m$, the base period $t_{bn}$ during which this happens is reset to zero, to restart over again, even if only a minimum time $t_e$, has elapsed since the start of $t_{bo}$ said base period. By this means it is assured that no more than one base period will be allowed to pass before the temperature is adjusted to maintain the consistency of the frozen mix.

Those skilled in the art will quickly see that there are numerous changes which can be made in the foregoing program which would not depart from the spirit and intent of the present invention. Further, that the invention could be applied to machines for manufacturing soft ice cream and the like of substantially different design, and still accomplish the same and similar functions in such machines as are described and claimed herein, without departing from the spirit and intent of the invention.

For example, controller means 10 of the present invention could actually compute the duty cycle of the accumulated incremental serving periods, referred to said base period, and could adjust the temperature of the freezing chamber 20 directly proportionately to said duty cycle during the succeeding base period. Or, controller means 10 could have associated therewith means for measuring the consistency of the frozen product mix in freezing chamber in the subsequent base period, inversely proportionately to said consistency measurement. The consistency could be measured by one of several means, e.g., by the electrical demand of mixing motor 31, and the temperature of the freezing chamber could be adjusted inversely proportionately to said measurement when it varies from a given value or range, thus preserving the desired serving consistency of the frozen product mix.

The terms and expressions which have been employed in the foregoing specification are used therein as terms of description and not of limitation, and there is no intention, in the use of such terms and expressions, or excluding equivalents of the features shown and described or portions thereof, it being recognized that the scope of the invention is defined and limited only by the claims which follow.

What we claim as our invention is:

1. In a controller means for operating an apparatus for manufacturing soft ice cream and the like, said soft ice cream being served with a desired characteristic, said controller means responsive to the actuation, for incremental serving periods, of a dispenser spigot, the improvement comprising:
    said controller means having preset therein a base period and having:
    1. means for accumulating said incremental serving periods during said base period, and comparing said accumulated incremental serving periods to said base period; and
    2. means for maintaining said desired characteristic as said accumulated incremental serving periods vary during successive base periods.

2. In the controller means of claim 1, said desired characteristic being the consistency of said soft ice cream, and said means for maintaining said desired consistency comprising:
    means for adjusting the temperature of said soft ice cream during a given base period directly and proportionately according to said accumulated incremental serving periods during a base period immediately preceeding said given base period.

3. In the controller means of claim 1, said desired characteristic being the consistency of said soft ice cream, and said means for maintaining said desired consistency comprising:
    means for measuring, during said base period, said consistency of said soft ice cream, and adjusting the temperature of said soft ice cream inversely and proportionately according to said consistency.

4. In the controller means of claim 3, said apparatus having a motor for driving a mixer, said means for measuring said consistency during said base period including means to measure the torque of said motor driving said mixer.

5. In the controller means of claim 4, said motor being an electric motor and said means for measuring said consistency being means for measuring the electrical demand thereof.

6. In a controller means for operating an apparatus for manufacturing soft ice cream and the like, said soft ice cream being served at the serving temperature T1, said controller means being responsive to the actuation, for incremental serving periods, of a dispenser spigot, the improvement comprising:
    said controller means having preset therein a base period, and having:
    1. means for accumulating said incremental serving periods during said base period, and determining if the accumulated total of said incremental serving periods exceeds a certain value during said base period; and
    2. means for decreasing said serving temperature from said 11 when said accumulated total of said incremental serving periods does not exceed said certain value during said base period, and for returning said serving temperature toward said T1 when said accumulated total of said incremental serving periods equals or exceeds said certain value during said base period.

7. The controller means of claim 6 wherin said controller means has means therein for resetting said base period to restart whenever said accumulated total of said incremental serving periods equals or exceeds said certain value before the termination of said base period.

8. The controller means of claim 6, wherein said means for decreasing said serving temperature decreases said serving temperature a preset amount each time said accumulated total of said incremental serving periods does not exceed said certain value during said base period until:
    a. said accumulated total of said incremental serving periods equals or exceeds said certain value; or
    b. said serving temperature reaches a preset level below said T1 where it remains until said accumulated total of said incremental serving periods equals or exceeds said certain value;
after either of which event, said base period is reset to restart and said serving temperature is reset to T1.

9. In an apparatus for manufacturing soft ice cream and the like form prepared liquid mixes, said apparatus having a reservoir, temperature sensor, freezing chamber, compressor, mixer and auger, dispenser means, and a controller means, said reservoir releasing said prepared liquid mixes into said freezing chamber as needed, said apparatus preferably serving said soft ice cream at a temperature T1, and said controller means having therein programs for a normal cycle and a serve cycle, the improvement comprising:
    a sub-routine for said programs which provides for reducing said serving temperature below said temperature T1 whenever said apparatus serves less than a preset amount of said soft ice cream during a given time, and resets said serving temperature to temperature T1 whenever said apparatus serves said preset amount or more of said soft ice cream during said given time.

10. The apparatus of claim 9, wherein in said normal, said controller means:
    a. goes into said serve cycle whenever said dispenser means is activated;
    b. actuates said compressor, and said mixer and auger, when said temperature sensor detects a temperature warmer than said T3, and deactivates said compressor, and said mixer and auger, when said temperature sensor detects a temperature equal to or cooler than said temperature T1, unless:

1. said temperature T3 has been detected after said dispenser means has been activated; and
2. said controller means has entered said sub-routine immediately prior to said activation of said dispenser means.

11. The apparatus of claim 9, wherein in said serve cycle, said controller means provides means for keeping track of the amount of said soft ice cream served during a given time, and comparing said amount with said preset amount.

12. The apparatus of claim 9, wherein in said sub-routine said controller means provides means for resetting said given time to restart whenever said apparatus serves said preset amount or more of said soft ice cream before said given time has elapsed, and resets said given time to restart whenever said given time has elapsed without said preset amount of said soft ice creram being served during said given time.

13. In a controller means for operating an apparatus for manufacturing soft ice cream and the like from prepared liquid mixes, said apparatus having a reservoir, temperature sensor, freezing chamber, compressor, mixer and auger, and dispensor means, said reservoir releasing said prepared mixes into said freezing chamber as needed, said apparatus preferably serving said soft ice cream at a preferred temperature T1, said compressor, and said mixer and auger being actuated when said temperature sensor detects a temperature T3 warmer than said preferred temperature T1 in said soft ice cream, and being deactuated when said temperature sensor detects a temperature T4 a preset amount cooler than said preferred temperature T1, said apparatus having a NORMAL cycle of operation and a SERVE cycle of operation, and said controller means being responsive, for incremental serving periods, to the activation of said dispensor means, THE IMPROVEMENT COMPRISING:

a. said controller means controlling:
  1. said NORMAL cycle of operation by a first program; and
  2. said SERVE cycle of operation by a second program;
b. each of said first and said second programs having a plurality of selected entry points thereinto;
c. said controller means including a sub-routine called a ONE-SECOND routine, and including, when in said ONE-SECOND routine;
  1. timer means A;
  2. timer means E;
  3. time periods;
    A. a one second delay period;
    B. period $t_a$, the accumulated incremental serving periods;
    C. base period $t_b$, being a preset period;
    D. period $t_m$, the time required to empty said freezing chamber of said soft ice cream;
    E. said one-second delay period being initiated by entry of said controller means into said ONE-SECOND routine;
    F. said period $t_a$ accumulating as said dispensor means is activated for said incremental serving periods;
    G. said base period $t_b$ being initiated by the occurence of one of the following events:
      I. turning on said apparatus into said NORMAL cycle of operation;
      II. the termination of a preceding base period $t_b$; or
      III. the completion of a period $t_a$ equal to or greater than period $t_m$;
    H. period $t_e$, elapsed from the initiation of $t_b$, and measured by timer means E; and
  4. means for adjusting downward temperatures T1,T3, and T4 by increments $\Delta T1$, said $\Delta T1$ being adjustable to a value max $\Delta T1$;
d. when in said ONE SECOND routine, said controller means:
  1. delays one second;
  2. compares said period $t_a$ with period $t_m$:
    A. if said period $t_a$ equals or exceeds said period $t_m$:
      I. resets said $\Delta T1$ to zero (0):
      II. resets said period $t_a$ to zero (0):
      III. resets said period $t_e$ to zero (0); and
      IV. initiates said timer E;
    B. if said period $t_a$ is less than said period $t_m$, adds said one second to said elapsed period $t_e$;
  3. compares elapsed period $t_e$ with period $t_b$:
    A. if said elapsed period $t_e$ is less than base period $t_b$, returns to said selected entry point in said programs from which it entered said ONE-SECOND ROUTINE and continues in said program therefrom;
    B. if said elapsed period $t_e$ equals said base period $t_b$:
      I. resets said elapsed period $t_e$ to zero (0); and
      II. restarts timer E;
  4. compares said period $t_a$ with said period $t_m$:
    A. if said period $t_a$ equals or exceeds said period $t_m$:
      I. resets $\Delta T1$ to zero (0);
      II. decreases T1 by $\Delta T1$;
      III. decreases T3 by $\Delta T1$;
      IV. decreases T4 by $\Delta T1$;
      V. resets said period $t_a$ to zero; and
      VI. returns to said selected entry point in said program from which it entered said ONE-SECOND ROUTINE, and continues therefrom in said program;
    B. if said period $t_a$ is less than said period $t_m$:
      I. increases $\Delta T1$ by a preset amount;
      C. compares said increased $\Delta T1$ with said max $\Delta T1$:
        I. if said increased $\Delta T1$ is greater than said max $\Delta T1$, said max $\Delta T1$ is selected;
        II. if said increased $\Delta T1$ is equal to or less than said max $\Delta T1$, said increased $\Delta T1$ is selected:
      D. changes said T1 by the lesser of $\Delta T1$ or max $\Delta T1$; and
        I. sets a new temperature T3;
        II. sets a new temperature T4;
        III. resets said period $t_a$ to zero (0); and
        IV. returns to said selected entry point in said program from which it entered said ONE SECOND routine and continues therein;
e. each of said NORMAL and said SERVE cycles entering said ONE-SECOND routine at said selected entry points in said first and said second programs.

14. The controller means of claim 13 wherein said NORMAL cycle has a FIRST ROUTINE and a SECOND ROUTINE, during said NORMAL cycle, said controller means:

a. checks said temperature sensor, and;
   1. enters into a FIRST ROUTINE when said temperature of said frozen mix is warmer than said temperature T3, ;
   2. enters into a SECOND ROUTINE when said temperature is equal to or cooler than said temperature T3; and
      A. reenters said FIRST ROUTINE when said temperature is warmer than said temperature T3;
   3. in said FIRST ROUTINE, when said temperature is equal to or cooler than said temperature T1,
      A. turns off said mixer, then said compressor, then enters said SECOND ROUTINE; and
b. enters into said SERVE cycle of operation when said dispenser means is activated in said FIRST and said SECOND ROUTINES.

15. In the apparatus for manufacturing soft ice cream of claim 14, wherein said apparatus has a READY light, a NOT READY light, and a PORTION CONTROL means, and said FIRST ROUTINE has a T1 CYCLE and a T3 CYCLE, the improvement wherein, after entering said FIRST ROUTINE, said controller means:
    a. turns off said READY light;
    b. turns on said NOT READY light; and
    c. disables said PORTION CONTROL means;
    d. turns on said compressor, then said mixer and auger;
    e. goes through said ONE SECOND ROUTINE; and
    f. checks to see if said temperature sensor detects a temperature warmer than said temperature T3:
       1. if so, re-cycle through said ONE SECOND ROUTINE:
       2. if not, enters said T3 CYCLE, wherein;
          A. if said temperature sensor detects a temperature equal to or cooler than said temperature T3, said controller means:
             I. turns off said NOT READY light;
             II. turns on said READY LIGHT; and
             III. enables said PORTION CONTROL means;
             IV. goes through said ONE SECOND ROUTINE: and
             V. enters said T1 CYCLE wherein:
                (a) if said temperature sensor detects a temperature:
                   (1) warmer than said temperature T1, said controller means recycles through said ONE SECOND ROUTINE;
                   (2) equal to or cooler than said temperature T1, said controller means turns off said mixer and auger, then said compressor; and
                   (3) enters said SECOND ROUTINE.

16. In the apparatus for manufacturing soft ice cream of claim 14, wherein said apparatus further includes a multiplicity of internal counters including a loop counter, a READY light, a NOT READY light, a PORTION CONTROL means, and said SECOND ROUTINE has a FIRST SUB-ROUTINE and a SECOND SUB-ROUTINE, the improvement wherein:
    a. after entering said SECOND ROUTINE, said controller means:
       1. turns off said NOT READY light;
       2. turns on said READY light;
       3. enables said PORTION CONTROL means;
       4. sets said counters to zero (0);
       5. clears said loop counter; and
       6. enters said FIRST SUB-ROUTINE, wherein;
    b. if said dispenser means is;
       1. activated, said controller means enters said SERVE cycle of operation;
       2. not activated and said temperature sensor detects a temperature:
          A. warmer than said T3, said controller means goes into said FIRST ROUTINE; or
          B. equal to or cooler than said temperature T3, said controller means:
             I. enters said SECOND SUB-ROUTINE wherein;
                (a) said controller means goes through said ONE SECOND ROUTINE; and
                (1) if said temperature sensor
                (A) detects a temperature cooler than said temperature T4, disables said compressor; or
                (B) detects a temperature equal to or warmer than said temperature T4, enables said compressor;
                (2) checks to see if said compressor "off time" is:
                (A) not complete, continues SECOND sub routine;
                (B) complete:
                (I) turns on said compressor:
                (II) turns on said mixer and auger for a pre-set time one-half way through said compressor "on-time"; and
                (a) checks to see if compressor "on time" is complete:
                   (1) if not, continues said SECOND SUB-ROUTINE;
                   (2) if so, turns off said compressor and continues said SECOND SUB-ROUTINE:
                (4) checks to see if said mixer "off time" is complete:
                (A) if yes, turns on said mixer for a preset time and returns to said SECOND SUB-ROUTINE;
                (5) checks to see if said dispensor means is activated:
                (A) if so, goes into said SERVE cycle of operation;
                (B) if not, checks to see if five (5) loops of said SECOND SUB-ROUTINE have been completed:
                (I) if not, re-enter said SECOND SUB-ROUTINE;
                (II) if so, clear loop counter and re-enter said FIRST SUB-ROUTINE and re-cycle therein.

17. In the apparatus for manufacturing soft ice cream of claim 15, wherein said apparatus includes a multiplicity of internal counters including a loop counter, a READY light, a NOT READY light, a PORTION CONTROL means, and said SECOND ROUTINE has a FIRST SUB-ROUTINE and a SECOND SUB-ROUTINE, the improvement wherein:
    a. after entering said SECOND ROUTINE, said controller means:
       1. turns off said NOT READY light;
       2. turns on said READY light;
       3. enables said PORTION CONTROL means;

4. sets said counters to zero (0); clears said loop counter, and enters said FIRST SUB-ROUTINE, wherein:
  A. if said dispenser means is activated, goes to said SERVE cycle of operation;
  B. if said dispenser means is not activated and said temperature sensor detects a temperature:
    I. warmer than said temperature T3;
    (a) enters said FIRST ROUTINE;
    II. equal to or cooler than said temperature T3;
    (a) enters said SECOND SUB-ROUTINE and goes through said ONE SECOND ROUTINE;
  C. if said temperature sensor detects a temperature;
    I. cooler than said temperature T4;
    (a) disables said compressor and returns to said SECOND SUB-ROUTINE; or
    II. equal to or warmer than said temperature T4:
    (a) enables said compressor and continues in said SECOND SUB-ROUTINE;
  D. checks to see if said compressor "off-time" is completed:
    I. if not, continues in said SECOND SUB-ROUTINE;
    II. if so, turns on said compressor, and;
    (a) turns on said mixer and auger for a pre-set time one-half (½) way through compressor "on-time";
  E. checks to see if compressor "on-time" is complete:
    I. if not, continues in said SECOND SUB-ROUTINE;
    II. if so, turns off said compressor and returns to said SECOND SUB-ROUTINE:
  F. checks to see if mixer and auger "off time" is complete;
    I. if not, continues in said SECOND SUB-ROUTINE:
    II. if so, turns on said mixer and auger for a pre-set time and returns to said SECOND SUB-ROUTINE;
  G. checks to see if said dispenser means is activated:
    I. if so, goes into said SERVE cycle of operation;
    II. if not, checks to see if said SECOND SUB-ROUTINE has been completed five (5) times:
    (a) if not, re-enters said SECOND SUB-ROUTINE at said ONE SECOND ROUTINE;
    (b) if so, clears said loop counter and recycles through said FIRST SUB-ROUTINE, 18. The controller means of claim 13 wherein during said SERVE cycle, said controller means:
  a. turns on said mixer and auger;
  b. resets said timer means E to zero (O);
  c. adds said one second to said elapsed time $t_e$
  d. if said temperature is:
    1. warmer than said temperature T3;
    A. turns off said READY light;
    B. turns on said NOT READY light; and
    C. disables said portion control means;
    2. equal to or cooler than said temperature T3:
    A. turns on said READY light;
    B. turns off said NOT READY light; and
    C. enables said portion control means;
  e. checks to see if said dispenser means is actuated:
    1. if so:
    A. activates said timer E;
    B. adds said $t_e$ to said $t_e$;
    C. enters and goes through said ONE-SECOND routine;
    D. checks to see if said temperature is:
      I. warmer than, or equal to or cooler than said temperature T3, and recycles therefrom;
    1. if so:
    A. enters and goes through said ONE SECOND routine;
    B. adds said $t_e$ to said $t_a$;
  f. checks to see if said dispenser means is actuted:
    1. if so:
    A. re-enters said SERVE cycle;
    2. if not:
    A. checks to see if said serve time is equal to or exceeds said fixed time;
      I. if yes, checks to see if said freezer temperature equals or exceeds said T3:
      (a) if no, enters said FIRST ROUTINE of said NORMAL cycle of operation;
      (b) if yes, enters said SECOND ROUTINE of said NORMAL cycle of operation;
      II. if no, checks to see if said ONE SECOND routine has been performed five (5) times;
      (a) if no, returns and re-enters said ONE SECOND routine if said dispenser means has not been activated;
      (b) if yes, returns and re-enters said SERVE cycle at said accumulated serve time $t_a$ and recycles therethrough.

19. The controller means of claim 18, wherein during said NORMAL cycle of operation, said controller means;
  a. checks said temperature sensor, and:
    1. enters into a FIRST ROUTINE when said temperature of said frozen mix is warmer than said temperature T3, :
    2. enters into a SECOND ROUTINE when said temperature is equal to or cooler than said temperature T3; and
    A. reenters said FIRST ROUTINE when said temperature is warmer than said temperature T3;
    3. in said FIRST ROUTINE, when said temperature is equal to or cooler than said temperature T1,
    A. turns off said mixer, then said compressor, then enters said SECOND ROUTINE; and
  b. enters into said SERVE cycle of operation when said dispenser means is actuated in said FIRST and said SECOND ROUTINES.

20. The controller means of claim 18, wherein during said NORMAL cycle of operation, said controller means:
  a. turns off said READY light;
  b. turns on said NOT READY light; and
  c. disables said PORTION CONTROL means;
  d. turns on said compressor, then said mixer and auger;
  e. goes through said ONE SECOND ROUTINE; and
  f. checks to see if said temperature sensor detects a temperature warmer than said temperature T3:

1. if so, re-cycles through said ONE SECOND ROUTINE:
2. if not, enters said T3 CYCLE, wherein:
    A. if said temperature sensor detects a temperature equal to or cooler than said temperature T3, said controller means:
        I. turns off said NOT READY light;
        II. turns on said READY LIGHT;
        III. enables said PORTION CONTROL means;
        IV. goes through said ONE SECOND ROUTINE: and
        V. enters said T1 CYCLE wherein:
            (a) if said temperature sensor detects a temperature;
            (1) warmer than said temperature T1, said controller means recycles through said ONE SECOND ROUTINE;
            (2) equal to or cooler than said temperature T1, said controller means turns off said mixer and auger, then said compressor; and
            (3) enters said SECOND ROUTINE.
21. The controller means of claim 18, wherein:
a. during said NORMAL cycle of operation and after entering said SECOND ROUTINE, said controller means:
    1. turns off said NOT READY light;
    2. turns on said READY light;
    3. enables said PORTION CONTROL means;
    4. sets said counters to zero (0);
    5. clears said loop counter; and
    6. enters said FIRST SUB-ROUTINE, wherein:
        A. if said dispenser means is:
            I. activated, enters said SERVE cycle of operation;
            II. not activated and said temperature sensor detects a temperature:
                (a) warmer than said T3:
                (1) goes into said FIRST ROUTINE; or
                (b) equal to or cooler than said temperature T3:
                    (1) enters said SECOND SUB-ROUTINE wherein:
                        (A) goes through said ONE SECOND ROUTINE; and
                B. if said temperature sensor:
                    I. detects a temperature cooler than said temperature T4, disables said compressor: or
                    II. detects a temperature equal to or warmer than said temperature T4, enables said compressor;
                C. checks if said compressor "off time" is:
                    I. not complete, continues SECOND SUB-ROUTINE;
                    II. complete:
                    (a) turns on said compressor:
                    (b) turns on said mixer and auger for a pre-set time one-half (½) way through said compressor "on-time"; and
                D. checks to see if said compressor "on-time" is complete:
                    I. if not, continues said SECOND SUB-ROUTINE;
                    II. if so, turns off said compressor and continues said SECOND SUB-ROUTINE;
                E. checks to see if said mixer "off time" is complete:
                    I. if so, turns on said mixer a pre-set time and returns to said SECOND SUB-ROUTINE;
                F. checks to see if said dispenser means is actuated:
                    I. if so, goes into said SERVE cycle of operation;
                    II. if not, checks if five (5) loops of said SECOND SUB-ROUTINE have been completed:
                    (a) if not, re-enters said SECOND SUB-ROUTINE;
                    (b) if so, clears loop counter and re-enters said FIRST SUB-ROUTINE and re-cycles therein.

* * * * *